June 30, 1936. C. F. PARRAGA 2,045,919
APPARATUS FOR THE TREATMENT OF ORES
Filed April 25, 1935 2 Sheets-Sheet 1

Inventor
Charles F. Parraga
By Sheffield & Betts
His Attorneys

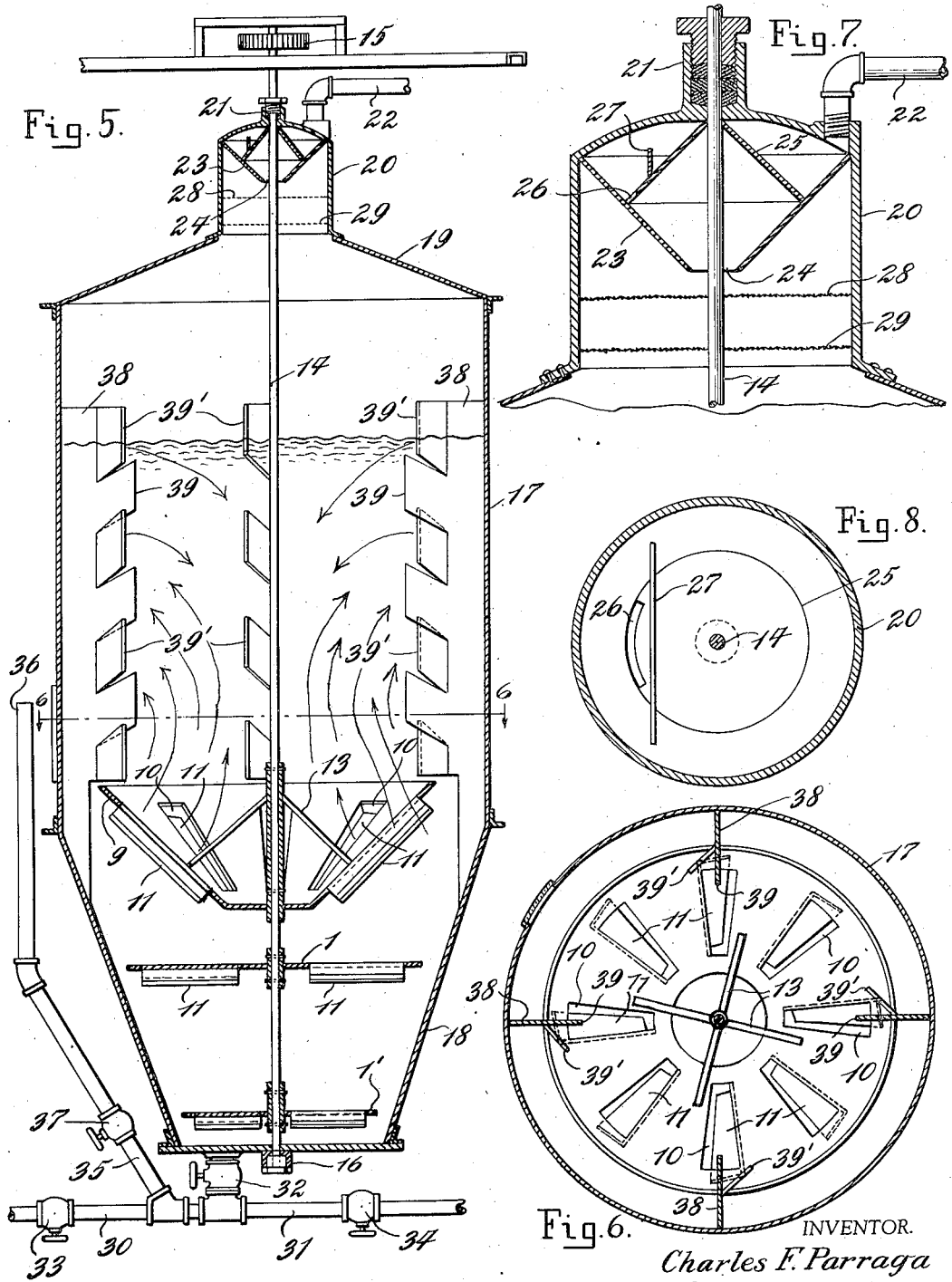

Patented June 30, 1936

2,045,919

UNITED STATES PATENT OFFICE 2,045,919

APPARATUS FOR THE TREATMENT OF ORES

Charles F. Parraga, Mexico, D. F., Mexico

Application April 25, 1935, Serial No. 18,106

6 Claims. (Cl. 259—107)

The present invention has for its object apparatus and means for carrying out the process set forth in the prior application of Arthur J. Elian, Serial No. 688,830, filed September 9, 1933, for "Process for clarifying liquids".

The present invention involves the use of a mechanical agitator for stirring or "scrubbing" solid particles contained in liquids, or for treating plain liquids more efficiently, and is applicable to any steps in manufacturing, mining, etc., that may require active agitation of its liquid mixtures.

This invention is particularly concerned with the extraction of valuable metals such as gold, silver, etc., from their ores when finely divided and treated in accordance with the so-called "cyanide" process or other processes.

It is a well known fact that minute particles of ore formed by grinding ore in a weak solution of active agents such as cyanides or even in pure water are surrounded by very thin coatings of air and similar gases which not only form a great hindrance to the making of true contacts between said particles and the reagent solutions, but also, through the effective reduction of the specific gravity of the particles owing to the attached air or gases greatly delay settling of the ore and often form scums or slimes that float on the surface of the liquid and are prevented from entering into the solution, which hinders the complete extraction of their valuable metal contents.

The effective removal of the coatings of air surrounding and contained in the recesses of the particles of the ore being treated is a very essential part of the method of and mechanism used for extracting the valuable metals from ores. To accomplish this, it is imperative that the solutions penetrate to and into the particles and maintain an intimate contact with the surfaces of the particles of the minerals.

Heretofore, attempt has been made to accomplish this result in practice principally by the injection of compressed air so that the agitation produced thereby causes collisions of the particles against each other and so tend to cause the cyanide solution to come into contact with the metal portions of the particles being treated. Such treatment has heretofore required a period of several days; whereas by the use of the present method of treatment and the apparatus described in this application, the scrubbing action or agitation of the particles of ore, etc., is reduced to a small fraction of that time.

Not only is this result attained, but in addition thereto the valuable contents of the ore are extracted to a much greater degree than has heretofore been possible, in that an extraction of from 90 to 95 and even more percent from the ore has been found possible with my improved method of treatment and the apparatus used therewith.

It must be appreciated that each particle of ore contains small fissures or indentations produced during the grinding thereof which, while not deep enough to cause the breaking of the particle into smaller ones, become nevertheless filled with air or other gases in such a manner as to make it impossible to withdraw the same and allow the reagent solutions to enter such fissures and do their work. This occurs in spite of the agitation which has ordinarily heretofore been given the particles, because the small fissures remain filled with air or gas even after the agitation, due to ordinary stirring, as well as the introduction of air for the same purpose.

In my improved method of treating the ore, the particles, during the continuance of such treatment, have had the air or gases completely removed therefrom, and the contact between the active solution of cyanide or other reagents is complete, so that the removal of the valuable contents thereof is more effectually and rapidly obtained than has heretofore been possible.

This is not only accomplished by the physical structures hereinafter to be described, but from the fact that the scrubbing or agitating action is carried out under the action of a vacuum or substantial partial vacuum, as set forth in said prior application Serial No. 688,830.

For a description of the agitating or scrubbing device involved as a part of the present invention, reference may be had to the following specification and to the accompanying drawings forming a part thereof, in which Fig. 1 is a plan view of the lower side of one form of the agitating device or element.

Fig. 5 is a vertical sectional view of a container having my improved agitating elements in preferred positions therein.

Fig. 6 is a transverse sectional view taken substantially on the line 6—6 of Fig. 5, Fig. 7 is a vertical sectional view of the upper portion of the apparatus shown in Fig. 5.

Fig. 8 is a sectional view of the apparatus as shown in Fig. 5, the top thereof being removed.

Figure 1:
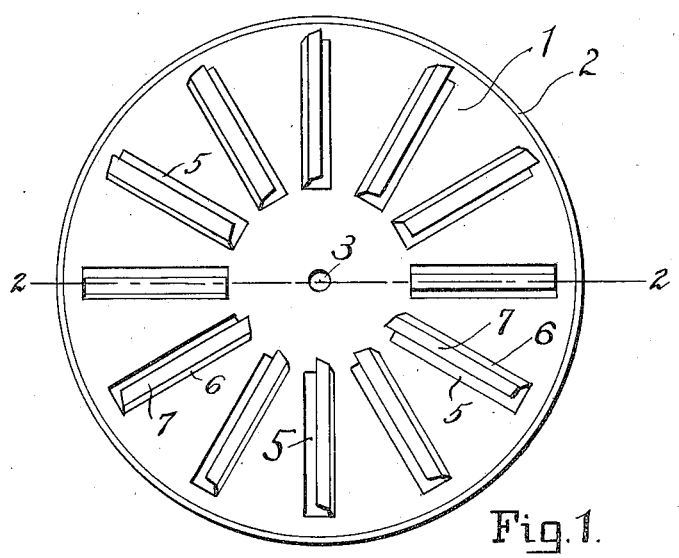
Figure 2:
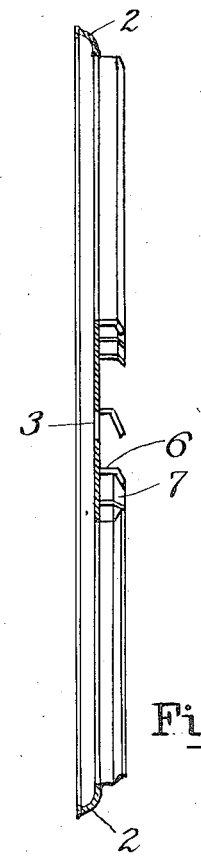
Fig. 2 is a vertical sectional view of the same taken substantially on the line 2—2 of Fig. 1.
Figure 3:
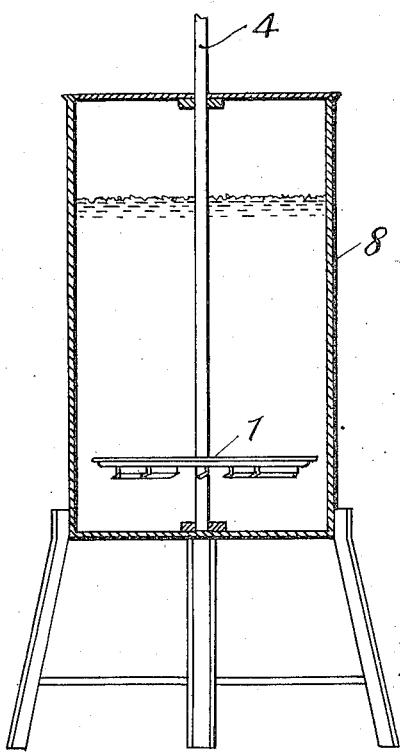
Fig. 3 shows a vertical sectional view of the agitating element of Figs. 1 and 2 in place within a tank or container.

With reference to Figs. 1–3 of the drawings, the numeral 1 represents a metallic disc which carries a marginal flange 2. At the center of said disc is a perforation 3 for suitable attachment to an arbor or shaft 4. The disc 1 has a number of radial slots or perforations 5. The tongues formed by cutting the metal to produce the slots or openings 5 are first bent away from the opening so as to form outwardly extending walls 6 which may be at right angles, or substantially so as to the surface of the disc. Said tongues are then bent so as to form outer parallel or slightly inclined portions 7.

For the purpose of smooth stirring or agitating operations, the perforated disc is placed centrally in a tank or container 8 for the liquid or material to be treated. The extending portions 6, as well as the inclined or horizontal portions 7 extending therefrom, serve to raise the liquid and solids contained therein as a result of the rotation of said disc, and so produce successions of upward and circular impulses about the center of the tank but adjacent its walls.

Fig. 3 of the drawings shows the agitating disc arranged to rotate toward the left, and obviously should the disc be rotated toward the right, the tongues of the apertures should be placed to extend in the contrary direction, it being essential that said tongues act as elevators and distributors and consequently extend in the same direction as the motion of rotation of the disc.

Figure 4:
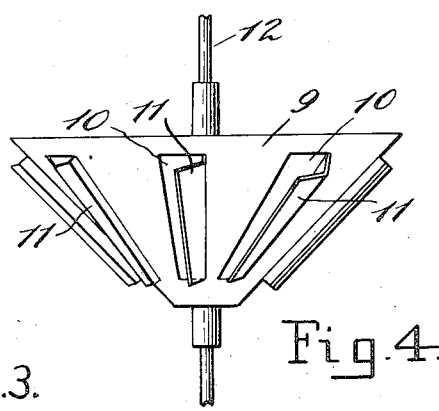
Fig. 4 is a view in side elevation of the agitating element in inverted conical form.

In Fig. 4 there is illustrated an agitating device 9 of conical form, said device having perforations or apertures 10 with extending tongues 11 similar to those illustrated in Fig. 1. This agitating device may be supported on a central arbor 12, and may be braced thereon by appropriate radial struts 13, as illustrated in Fig. 5. As illustrated in Fig. 5 the agitator 9 is fastened to the central shaft 14 and the upper end of this shaft may be fixed to a suitable gear or other form of rotating device 15, said gear being driven from a suitable source of power (not illustrated). The vertical shaft 14 is supported at its lower end by a suitable bearing 16 which permits its free rotation without leakage of the contents of the tank therefrom, or the entrance of air into the tank, caused by the vacuum suction.

At suitable places on the shaft 14, dependent upon the amount of material being treated and the character of the same, are placed circular disc-like agitators 1 and 1', similar to that illustrated in Figs. 1, 2 and 3. The container or tank 17 of Fig. 5 is preferably cylindrical in form and is made conical or tapering at its lower end, as indicated at 18, if found to be desirable under special circumstances. The upper or cover portion 19 of the container is provided at its central portion with a cylindrical projection 20 through the upper end of which shaft 14 passes, where it is provided with a suitable stuffing box or gland 21. The cylindrical portion 20 is provided with a connection for a pipe 22 which extends to a suitable vacuum or exhausting apparatus in order to produce a substantial vacuum within the container 17 and its lower portion 18. Within the cylindrical extension 20 I provide a cone-shaped baffle device 23 which is open at its lower end, as indicated at 24, and is provided with a reverse cone-shaped baffle 25 which extends to the outer cone-shaped portion 23. The latter is provided with an opening 26 of which there may be several if desired. Above the opening 26 is a transverse plate or strip 27 forming an additional baffle plate. These baffle plates form buffers which prevent or hinder the withdrawal of foam or particles of the mixture so that the action of the violent agitation and the suction of the vacuum pump does not withdraw the same from the tank or container. Below the cone-shaped baffle 23 are one or more screens 28 and 29 in the form of wire netting or other preferred construction. These also form baffles which tend to prevent foam or other particles thrown upwards by the violent agitation of the mixture within the tank from entering into the suction pipe 22.

Connected with the bottom of the tank or container are feed and discharge pipes 30 and 31, respectively, the same being connected with the bottom of the portion 18 of the container by a suitable valve 32. Valves 33 and 34 are provided respectively in the feed pipe 30 and the discharge pipe 31 to control the flow of liquid therethrough. The feed pipe 30 is connected with a branch pipe 35 which extends upward as indicated at 36, where its end is open to the atmosphere. Said pipe is also provided with a valve 37 which prevents the air from entering the feed pipe 30 and the tank except when desired, as will be hereinafter pointed out.

The lateral walls of the tank or container are provided with vertical radial fins or plates 38 which are cut transversely, as indicated, to form tongues 39, some of which, as indicated at 39', as in Fig. 6, are bent out of line with the plate to form portions for deflecting the mixture passing the same, whereby its tendency to rise and expand radially by reason of its rotation and centrifugal action, is opposed and the mixture is caused to fall toward the center of the tank where it meets the upward flow from the agitator. Thus the projections or tongues serve most effectively to agitate the liquid and cause a greater scrubbing action or intimate contact between the particles, and enables larger surfaces of the ore to be acted upon by the vacuum by causing more rapid removal of the films or layers of gas surrounding the particles being treated.

It will be apparent that the radial plates and tongues 38 and 39 may be applied to the agitating device as illustrated in Fig. 3, special illustration thereof not being necessary, in view of the illustration of corresponding parts in Fig. 5.

In Fig. 5, the line 6—6 represents the approximate height of the surface of the mixture or the load in the tank before agitation. The wavy line in Fig. 5 indicates approximately the height of the surface of the mixture when under full agitation.

Without the introduction of the radial plates the liquid rotates quite easily, owing to the rotary motion of the agitator, and consequently produces a motion analogous to that of a vortex, which causes the liquid to flow around the walls of the tank in rapid, rising, circular and smooth motion and thereafter continuing to flow in the same direction and velocity when the whole attains the speed of the disc.

In order to obtain a more violent agitation and to break up the vortex action produced by the rotating motion of the liquid, the above described radial plates or tongues are introduced. The radial plates and the inclined portions of the tongues cause the breaking of the vortex and then the liquid is violently thrown toward the center of the tank, supplementing the action of the conical form of the agitator 9 of Fig. 5, which tends to produce a similar result.

In the application of treatment of ores by my improved apparatus above described, particularly in connection with an extracting process for gold and other valuable metals, I consider it advisable to first obtain a homogeneous mixture of the ores with the solutions by treating the same in a plain or cylindrical tank such as that illustrated in Fig. 3 without the application of the vacuum thereto. After a sufficiently homogeneous mixture has been obtained, the treatment may be continued in the container or tank illustrated in Fig. 5, where the substantially perfect and complete removal of the air coatings about the particles of ore is produced, and there results very rapidly a substantially perfect contact between the reagents and the valuable contents of the ore.

In the cyaniding process, as is well known, it becomes necessary to introduce oxygen to dissolve the gold and silver with which the cyaniding solution comes into contact.

When the removal of the air and gases is complete, the oxygen of the atmosphere is introduced by opening the valves 32 and 37 so that the suction resulting from the vacuum draws the air into the bottom of the container and allows it to pass through the solution, during which it comes into contact with the exposed surfaces of the valuable metallic contents of the ore. This is preferably done while the agitation is being continued so that the air is sucked in and forcibly distributed within the mixture owing to the violent agitation. This produces the required oxidation. After this has continued for a short time, the said valves are closed. The agitation and vacuum are continued for a sufficient period to assure the final settling action resulting from the fact that the true specific gravity of the particles is effected to cause them to settle rapidly when the mixture is allowed to stand or to remain quiescent in the same container or in another settling container to which the solution may be transferred. Thereafter the solution containing the valuable metals which have been removed from the ore is treated in accordance with the usual and well known precipitating processes.

Having thus described the above embodiments of my invention, I do not wish to be understood as being limited to the details of form, arrangement of parts, or steps of procedure herein set forth except in so far as may be consistent with the scope and tenor of the accompanying claims, for various changes may be made by those skilled in the art without departing from the advantages incident to the above described invention.

What I claim and desire to protect by Letters Patent, is:

1. Apparatus for the treatment of finely divided particles suspended in a liquid or semi-liquid, comprising, a container for the liquid carrying said particles, an agitator in the lower portion thereof producing upward motions of said liquid, deflectors arranged transverse to radii and located in the upper portion of said container, to produce inward motions of said liquid in directions contrary to the first mentioned motions, and means for producing an effective vacuum in said container.

2. Apparatus for the treatment of finely divided particles suspended in a liquid or semi-liquid, comprising, a container for the liquid carrying said particles, a rotary agitator adjacent the bottom of said container and producing upward motions of said liquid, deflecting plates having portions inclined to radii and carried by the wall of said container, to produce inward motions of said liquid in directions contrary to the first mentioned motions whereby a scrubbing action is accomplished, and means to produce an effective vacuum in said container.

3. Apparatus for the treatment of finely divided particles of ore and the like, suspended in a liquid or semi-liquid, comprising, a container for the liquid carrying said particles, a rotary agitator adjacent the bottom of said container and producing upward motions of said liquid, and deflecting plates attached to the walls of said container, to produce reverse motions of said liquid, said plates having alternate series of radial and inclined portions whereby the currents produced thereby and by said agitator cause a scrubbing action among said particles.

4. Apparatus for the treatment of mineral ores comprising, in combination, a container for liquids carrying said ores, an agitator therein having elongated openings and deflecting tongues extending from the margins thereof with portions extending approximately parallel with the surface of said agitator, and a plurality of series of deflecting tongues extending inward from the walls of said container, some of said tongues being radially disposed and others thereof being at an angle with respect to the latter, to deflect and cause reverse motions of the liquid being treated.

5. Apparatus for the treatment of mineral ores comprising, in combination, a container for liquids carrying said ores, a plurality of agitators therein having elongated openings and deflecting tongues extending from the margins thereof and having portions extending approximately parallel with the surfaces of said agitators, and a plurality of series of vertical tongues extending inward from the walls of said container, a plurality of said tongues being radially disposed and intermediate tongues being at an angle with respect to the latter, said agitators being located in said container below said tongues and the uppermost agitator being of inverted cone shape to cause an upward central flow of the liquid solution in said container.

6. Apparatus for the treatment of mineral ores comprising, in combination, a container for liquids carrying said ores, a rotatable agitator in the lower portion thereof for agitating and forcing said liquid upward, a closure for the top of said container, a reversely truncated baffle located within said closure, a second baffle located within said truncated baffle, reticulated members, forming strainers, located below said baffles, and connections for exhausting gases from the upper part of said closure above said baffles.

CHARLES F. PARRAGA.